US006835391B2

(12) United States Patent
Bezemer et al.

(10) Patent No.: US 6,835,391 B2
(45) Date of Patent: Dec. 28, 2004

(54) POLY (ETHER ESTER AMIDE) AND POLY (ETHER ESTER URETHANE) COPOLYMERS

(75) Inventors: Jeroen Mattijs Bezemer, Utrecht (NL); Jan Feijen, Hengelo (NL); Pieter Jelle Dijkstra, Borne (NL)

(73) Assignee: Chienna B.V., Bilthoven (NL)

( * ) Notice: Subject to any disclaimer, the term of this patent is extended or adjusted under 35 U.S.C. 154(b) by 63 days.

(21) Appl. No.: 10/112,062

(22) Filed: Mar. 29, 2002

(65) Prior Publication Data

US 2003/0050422 A1 Mar. 13, 2003

Related U.S. Application Data

(63) Continuation of application No. PCT/NL00/00689, filed on Sep. 26, 2000.

(30) Foreign Application Priority Data

Sep. 30, 1999 (EP) ............................................. 99203196

(51) Int. Cl.[7] ............................ A61K 9/70; C08L 77/00; C08F 20/00

(52) U.S. Cl. ........................ 424/443; 528/288; 528/289; 528/302; 528/339; 525/420; 525/437; 525/440; 525/540; 424/444; 424/457; 435/1.1

(58) Field of Search .............................. 528/288, 289, 528/302, 335; 525/420, 437, 440, 540; 424/443, 444, 457; 435/1.1

(56) References Cited

FOREIGN PATENT DOCUMENTS

| GB | 2 063 279 A | | 6/1981 |
| WO | WO 98 00454 A | | 1/1998 |
| WO | WO 98/00454 | * | 1/1998 |

* cited by examiner

*Primary Examiner*—Samuel A. Acquah
(74) *Attorney, Agent, or Firm*—Banner & Witcoff, Ltd.

(57) ABSTRACT

The invention relates to new biologically degradable aliphatic copolymers of the polyesteramide or polyesterurethane type. The invention further relates to a method for preparing the copolymers and to products which can be manufactured from the new copolymers.

17 Claims, 7 Drawing Sheets

POLY (ETHER ESTER AMIDE) AND POLY (ETHER ESTER URETHANE) COPOLYMERS

Figure 1:
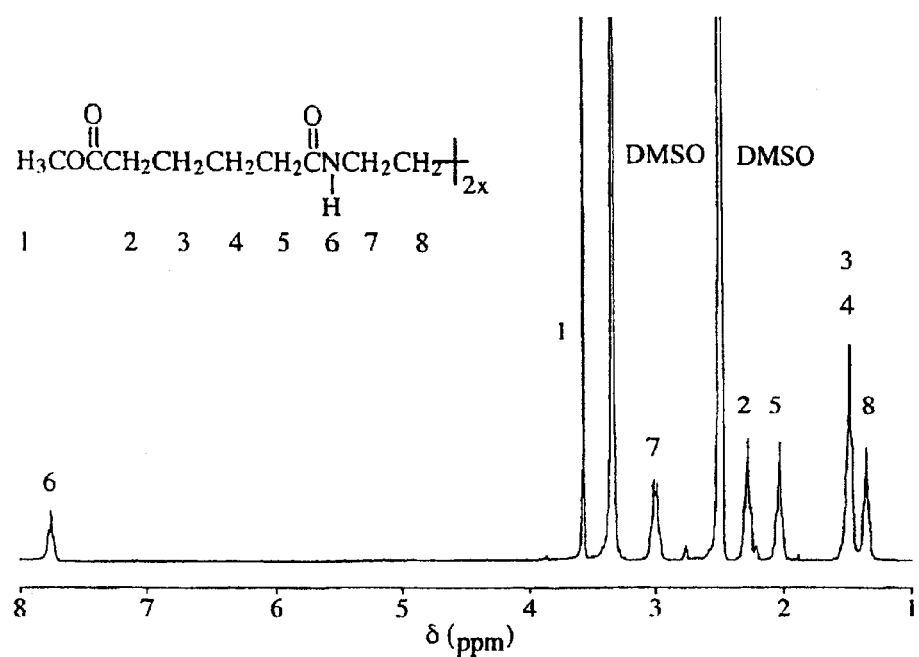

This application is a continuation of prior application No. PCT/NL00/00689, filed on Sep. 26, 2000; which claims priority from European patent application number 99203196.3, filed Sep. 30, 1999.

The invention relates to new biologically degradable aliphatic copolymers of the polyesteramide or polyesterurethane type. The invention further relates to a method for preparing the copolymers and to products which can be manufactured from the new copolymers.

There is a very wide variety of polymers and copolymers. Depending on their application, they may have a great diversity of properties. Especially the mechanical properties are of importance for the use of (co) polymers in end products.

Because polymeric materials in general, and plastics in particular, are used on a very wide scale, they cause an enormous waste problem. Since the environment and pollution thereof are strong issues with the general public, there has been a trend to seek new polymeric materials which may degrade in a biological environment. It has been found difficult, however, to provide polymeric materials which have a good, i.e. fast, degradation profile, and at the same time possess very good mechanical properties.

Recently, a new class of copolymers of the polyesteramide or polyesterurethane type has been disclosed in WO-A-98/00454. These copolymers are based on symmetrical, crystalline diamide-diols, diamide-diacids or diurethane-diols, together with a secondary monomer. This secondary monomer is chosen from the group of alkanediacids alkanediacid-chlorides, alkanediols, poly(alkane ether)diols, hydroxy acids (lactones), diisocyanates and combinations thereof.

Although this new class forms a relatively successful attempt at providing a polymeric material having both good mechanical properties and degradation properties, there still remains room for improvement. Particularly, the degradation profile of the copolymers of WO-A-98/00454 is not optimal for a sufficient fast breakdown of the material under all circumstances. This makes the copolymers less suitable for use as carriers for release of active agents, such as drugs, or as biomaterials in e.g. tissue engineering.

It is therefore an object of the invention to provide a polymeric material which shows superior degradation characteristics, without this improvement in degradation properties leading to an undesired deterioration of the mechanical properties in comparison with prior art materials.

Surprisingly, it has been found that this goal can be reached by incorporating a polyalkylene glycol component into the copolymer of the polyesteramide or polyesterurethane type disclosed in WO-A-98/00454. Accordingly, the invention relates to a new class of copolymers comprising symmetrical constant blocks (CB) and variable blocks (VB) of the formula:

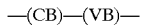

which copolymers comprise hydrophilic blocks. The definitions of the variables are given in claim 1.

The present copolymer is thus built up from a chain of building blocks, which each in turn consist per copolymer of a block with a fixed chemical structure and therefore a constant block length (designated hereinafter "constant block"), a block with a variable chemical structure and block length (designated hereinafter "variable block").

It has been found that the present copolymers have highly advantageous mechanical properties. Furthermore, they have very good degradation characteristics which can be controlled in a manner set forth below. More in particular, in an aqueous environment, articles of manufacture of the copolymers have been found to degrade throughout their structure, thus rendering such articles highly suitable for release of active agents.

The constant block is preferably an amide block or a urethane block. In this text, these terms may be used interchangeably. Depending on the desired properties of the copolymer, one or more types of constant block may be used within one copolymer. Variation can thus occur in the variable blocks. That is, one or more types of variable blocks can be used per copolymer. The required hydrophilic blocks, which are preferably variable blocks, offer another parameter to adjust the desired properties of the copolymer. Within one copolymer, different hydrophilic blocks may be present. These hydrophilic blocks may differ from each other chemically, in length or both. Although it is preferred that the hydrophilic blocks are variable blocks, it is also possible that the constant block is hydrophilic or comprises a hydrophilic block. In particular, it has been found feasible to incorporate polyethylene oxide (PEO) blocks in formula (2), as defined in claim 1. In this case, $Z_2$ may comprise such a PEO block provided with suitable end groups.

The amide blocks are randomly distributed over the polymer length and the uniform block length is retained during the preparation of the copolymer. The uniformity of the urethane blocks can be disrupted by the occurrence of ester-urethane exchange reactions or by alcoholysis of the urethane block, which may result in longer urethane block lengths. The said reactions, however, were under the reaction conditions found to rapidly reach an (equilibrium) plateau value which corresponds to a maximum of 15% block of which the uniformity is lost.

The uniformity of the block length is important for a number of reasons. Uniformity of the block length induces a more rapid crystallization and give better defined lamellae thicknesses of the crystalline phase. The two effects are particularly advantageous for a faster processing and for good mechanical properties, such as a high and constant young's modulus over a wide temperature range and a good dimensional stability. These advantageous properties were attributed to a good phase separation and a rapid crystal nucleation and/or growth.

The block length itself is particularly important for the rate of biological degradation of the constant block. Biodegradability decreases with increased molecular weight and increases with increasing hydrophilicity. The amide and urethane blocks described herein are preferably short, contain only two amide or urethane bonds per unit, are usually water soluble, are completely biologically degradable and display no toxicity.

The copolymer may be prepared by starting from suitable monomers as will be set forth below.

The monomers for the constant block are symmetrical, crystalline, water-soluble and have a chemical structure in one of the following three categories:

1.

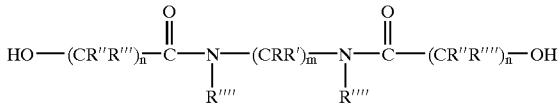

in which R, R', R", R''' and R'''' are the same or different and represent an H, hydrocarbyl or substituted hydrocarbyl or hydrocarbyl with protected O, N, and/or S functionality. This structure is further designated "diamide diol".

The mol weight of these monomers is preferably a minimum of (n=1 m=2; R—R''''=H)=176 g/mol and a maximum of (n=15; m=12; R—R''''=H) 685 g/mol for linear monomers without side groups of other hetero-atoms in the chain. Methyl side groups can for instance be included (R'=CH$_3$), as well as hetero-atoms in structure 1 such as for instance O.

This type of monomers can be manufactured by ring opening of lactones by a primary diamine, both in solution and in the melt, without external catalysts, as well as by condensation of a linear hydroxycarboxylic acid, or hydroxycarboxylic acid ester and a primary or secondary diamine. These possible lactones herein have the following general structure:

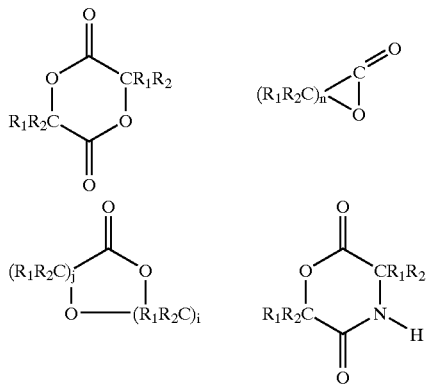

in which h is 2, 3, 4 or 5, i is 1 or 2, j is 1 or 2 and each R is an H or hydrocarbyl or substituted hydrocarbyl with protected O, N, and/or S functionality with a maximum of 30 carbon atoms. Preferred lactones are those in which R is hydrogen or methyl, and lactones which are particularly recommended are ε-caprolactone, δ-valerolactone, glycolide and lactides.

2.

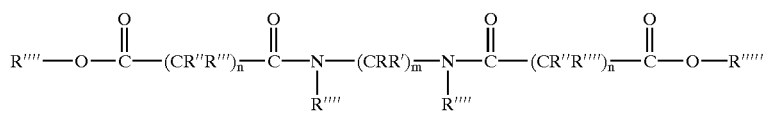

in which R, R', R'', R''', R'''' and R''''' are the same or different and represent an H, hydrocarbyl or substituted hydrocarbyl with protected functionality. R'''' and R''''' will usually be the same and are preferably not an H and n is preferably ≧4. This structure is further designated "diamide-diacid".

The mol weight of these monomers is preferably a minimum of (n=m=2; R—R''''=H)=260 g/mol and a maximum of (n=14; m=12; R—R''''=H)=737 g/mol for linear monomers without side groups or other hetero-atoms in the chain. Methyl side groups can for instance be included (R'=CH$_3$), as well as hetero-atoms in structure 2, such as for instance O.

These monomers can be manufactured by ring opening of cyclic anhydrides by a primary diamine, both in solution and in the melt, without external catalysts, as well as by condensation of a linear diacid, preferably esterified (in excess) and diamine with external catalyst. The possible cyclic anhydrides herein have the following general structure:

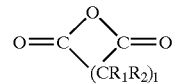

in which l is 2, 3 or 4 and each $R_1$ and $R_2$ is an H or hydrocarbyl or substituted hydrocarbyl with protected O, N, and/or S functionality with a maximum of 30 carbon atoms.

3.

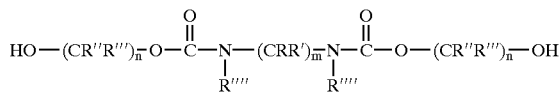

in which R, R', R'', R''' and R'''' are the same or different and represent an H, hydrocarbyl or substituted hydrocarbyl with protected functionality. This structure is further designated "diurethane-diol".

The mol weight of these monomers is preferably a minimum of (n=m=2; R—R''''=H)=236 g/mol and a maximum of (n=4; m=12; R—R''''=H)=432 g/mol for linear monomers without side groups or other hetero-atoms in the chain. Methyl side groups can for instance be included ($R_1$=CH$_3$), as well as hetero-atoms in structure 3, such as for instance O.

These monomers can be manufactured by ring opening of cyclic carbonates by a primary diamine, both in solution and in the melt, without external catalysts, as well as by reaction of a primary diamine with a linear aliphatic carbonate with alcohol end groups. The possible cyclic carbonates herein have the following general structure:

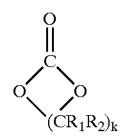

in which k is 2, 3 or 4 and each $R_1$, $R_2$ is an H or hydrocarbyl or substituted hydrocarbyl with protected O, N, and/or S functionality with a maximum of 30 carbon atoms.

Preferred carbonates are those in which $R_1$, $R_2$ is hydrogen or methyl and particularly recommended are trimethylene carbonate, ethylene carbonate, propylene carbonate, tetramethylene carbonate and 2,2-dimethyl trimethylene carbonate.

It is also possible to make amide and urethane blocks with a plurality of reactive end groups. Use must be made herein of for instance cyclic dimers or the above mentioned cyclic lactones, cyclic anhydrides and cyclic carbonates. Two examples of such structures are:

5,5'-bis(oxepan-2-one) and spiro-bis-dimethylene-carbonate, (2,4,7,9-tetraoxa[5,5]undecane dione-(3,8))

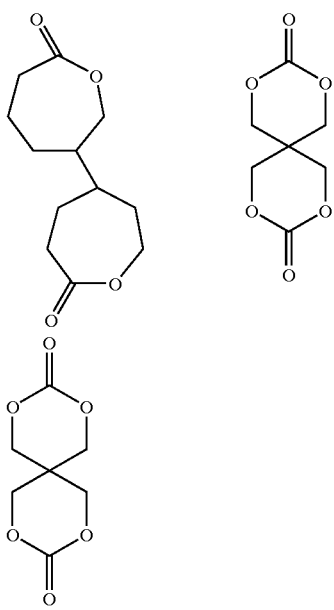

The monomers according to the invention can be used as primary monomer in polycondensation with a wide range of possible co-reagents resulting in an extensive series of copolymers.

As has been mentioned above, the variable block is chosen from the group of alkanediacids, alkanediacid-chlorides, alkanediols, poly(alkane ether)diols, and hydroxy acids, lactones, and diisocyanates. In many embodiments it is preferred that the present copolymer comprises more than one type of variable blocks within one molecule. In such a case, it is preferred that at least one of the types of variable blocks present has a relatively low boiling point. Examples of such blocks are 1,4-butanediol and ethylene glycol. Accordingly, poly(alkane ether) diacids are suitable to form or be part of the variable block. It is an important aspect of the invention that at least some of the variable blocks are hydrophilic blocks. The term 'hydrophilic blocks' is used herein to indicate that these blocks have an overall positive dipole moment or at least readily associate with or even dissolve in water. Preferably, these blocks are polar blocks, which preferably are water soluble. It is preferred that the copolymer comprises at least 5 wt. %, more preferably at least 10 wt. %, even more preferably at least 20 wt. % of hydrophilic blocks, based on the weight of the copolymer. The upper limit of the amount of hydrophilic blocks will depend on the desired degree of degradability, the desired mechanical properties and the length of the hydrophilic blocks, but will usually be below 80 wt. %, based on the weight of the copolymer. By varying the amount and length of the hydrophilic blocks, the degradability of the copolymers can be controlled. The skilled person, on the basis of his normal skills, will be able to optimize the degradability of the copolymers, given a certain objective application.

In a preferred embodiment, the copolymers comprises polyalkylene glycol hydrophilic blocks. Preferred polyalkylene glycols are chosen from the group of polyethylene glycol, and copolymers of polyethylene glycol and polypropylene glycol or polybutylene glycol, such as poloxamers. A highly preferred polyalkylene glycol is polyethylene glycol.

The terms alkylene and polyalkylene generally refer to any isomeric structure, i.e. propylene comprises both 1,2-propylene and 1,3-propylene, butylene comprises 1,2-butylene, 1,3-butylene, 2,3-butylene, 1,2-isobutylene, 1,3-isobutylene and 1,4-isobutylene (tetramethylene) and similarly for higher alkylene homologues. The polyalkylene glycol component is preferably terminated with a dicarboxylic acid residue —Q—CO—, if necessary to provide a coupling to the polyester component. Group Q may be an aromatic group having the same definition as R, or may be an aliphatic group such as ethylene, propylene, butylene and the like.

Preferably, the polyalkylene glycol has a weight average molecular weight of from 150 to 4000, more preferably of 200 to 1500. The weight average molecular weight may suitably be determined by gel permeation chromatography (GPC). This technique, which is known per se, may for instance be performed using tetrahydrofuran as a solvent and polystyrene as external standard.

The synthesis of the present copolymer is a two-step procedure wherein in the first step the diamide-diol, diamide-diacid (ester) or diurethane-diol is prepared and purified.

The diamide-diol for use in the preparation of the present copolymer can for instance be made by ring opening of a lactone by a diamine in stoichiometric ratio. This reaction may be performed in the melt or in solution and takes place with high yield and purity. The melting points of the monomers are dependent on the used diamine and lactone.

The diamide-diacid for use in the preparation of the present copolymer may for example be produced in solution by ring opening of a cyclic anhydride by a diamine in stoichiometric ratio, or by direct condensation in the melt of an excess of linear diacid or, preferably, dimethylester, with a diamine using a catalyst, such as $Ti(OBu)_4$. The first route results in uniform diamide-diacid blocks in high yield and purity. Methylating of acid end groups can take place in 100% yield by direct esterification in acidic environment. The second route also results in high yield. An additional purification to remove resulting longer blocks may be necessary to obtain a uniform block length. Optimization of the procedure is as yet possible.

The diurethane-diol for use in the preparation of the present copolymer may for instance be produced in solution or in the melt by ring opening of a cyclic carbonate by a diamine in stoichiometric ratio. High yield and purity can easily be obtained. Even higher purity may be achieved by washing and/or recrystallization.

The copolymer itself may be synthesized in a second step by a standard melt-condensation procedure wherein in addition to the above stated monomers from the three different categories, monomers, or mixtures thereof, are added from the following classes:

dialcohols such as ethylene glycol, 1,4-butanediol, 1,6-hexanediol, diethylene glycol and the like;

dicarboxylic acids such as succinic acids, glutaric acid, adipic acid and the like, preferably in the associated ester form;

hydroxy acids such as ε-hydroxy caproic acid, glycolic acid and the like, preferably in the associated ester form;

lactones such as ε-caprolactone, glycolide and the like.

From these monomers, plus the desired amounts of hydrophilic blocks, the variable blocks are formed which are present in the final copolymer.

It is otherwise conceivable that a one-step procedure may be developed wherein first a diamide or diurethane block is made from the correct monomers, whereafter the above mentioned monomers, mixtures thereof, or prepolymers (e.g. oligoesterdiols) thereof, and the polyalkylene glycol are added and the polycondensation is started.

Due to its highly advantageous properties, it is envisaged that the copolymer will find use in the pharmaceutical field for controlled release of bioactive agents, such as proteins, hormones, and drugs (antibiotics and the like). In addition, the material may be used as biomaterial, e.g. in the manufacture of scaffolds for tissue engineering, of devices for suturing, of sheets for preventing tissue adhesion and/or facilitating wound recovery, and the like.

The invention will now be further elucidated by the following, non-restrictive examples.

EXAMPLES

Materials and Methods

Materials

Dimethyl adipate, 1,4-diaminobutane, 1,4-dihydroxybutane, α-tocopherol, tetrabutylorthotitanoate (Ti(OBu)$_4$), poly(ethylene glycol) (PEG) MW=1000 g/mole, CDCl$_3$, DMSO-d$_6$ were obtained from Merck (Darmstadt, Germany). Phosphate buffered saline (PBS), pH 7.4 was purchased from NPBI (Emmercompascuum, The Netherlands). Lysozyme from chicken egg white (3x crystallized, dialyzed and lyophilized) was obtained from Sigma Chem Corp. (St. Louis, USA). All solvents used were of analytical grade.

Synthesis of diamide-dimethyl ester monomer and poly(ether ester amide)s

The synthesis of the diamide-dimethyl ester monomer (scheme 1) was carried out as described in the Dutch patent application 10.03459, with some slight modifications. Dimethyl adipate (116.9 g, 0.67 mole) was heated to 50° C. under a constant nitrogen flow. Subsequently, 0.25 g Ti(OBu)$_4$ was added, followed by slowly adding warm 1,4-diaminobutane (5.91 g, 0.067 mole) during a period of one hour. After methanol was distilled off for 4 hours, every half hour the temperature was increased with 25° C. up to a final temperature of 150° C. The melt was cooled to room temperature and filtered to remove the excess dimethyl adipate. The product was then dissolved in chloroform at 50° C. and filtered again. The chloroform was evaporated under reduced pressure and the product was washed three times with cold THF to remove remaining dimethyl adipate. Finally, the obtained product was dried at 40° C. in vacuo.

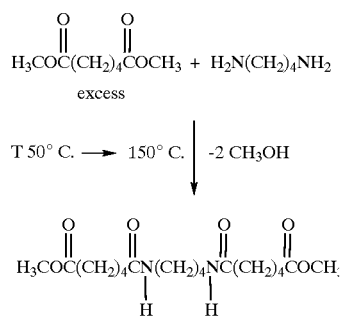

Scheme 1. Synthesis of the bisester-bisamide monomer from 1,4-diaminobutane and dimethyl adipate.

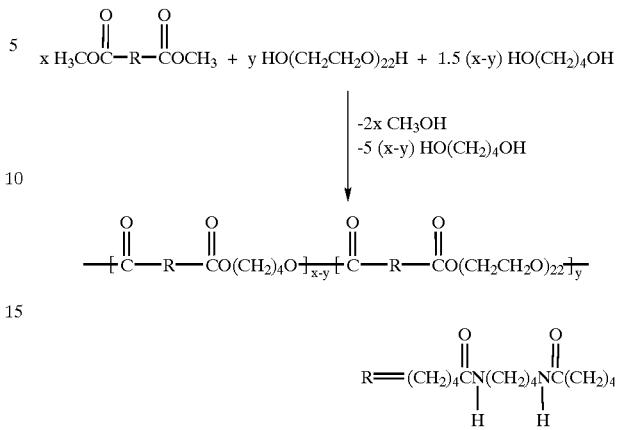

Scheme 2. Synthesis of poly(ether ester amide)s from PEG1000, 1,4-dihydroxybutane and bisester-bisamide blocks.

Poly(ether ester amide) multiblock copolymers were synthesized by melt polycondensation (scheme 2). Polymerization was carried out in a glass reactor with nitrogen inlet and a mechanical stirrer. As a typical example, the synthesis of 5 g of a poly(ether ester amide) containing 20 wt % poly(ethylene glycol) (PEG) is described. In a vessel, diamide-dimethyl ester monomer (3.80 g, $1.02 \times 10^{-2}$ mole), PEG1000 (1.02 g, $1.02 \times 10^{-3}$ mole), 1,4-dihydroxybutane (1.24 g, $1.38 \times 10^{-2}$ mole) and antioxidant (α-tocopherol) (0.06 g, 1.0 wt %), were heated to 175° C. under a nitrogen flow. A solution of the catalyst Ti(OBu)$_4$ in toluene (0.12 ml, 0.05 g/ml) was added to the melt and methanol was distilled off during 4 hours. Subsequently, the temperature was increased to 220° C. and the pressure was slowly reduced to 0.3 mbar. During 8 hours, the condensation product 1,4-dihydroxybutane was distilled off. After the reaction was stopped, the melt was slowly cooled to room temperature under nitrogen flow. Several copolymers were synthesized, with PEG contents varying from 20–65 wt %. The molecular weight of the PEG segment was 1000 g/mole.

Polymer Characterization

Proton NMR-spectra were recorded on a Bruker AC 250 operating at 250.1 MHz. CDCl$_3$ or DMSO-d$_6$ were used as solvents without internal standard.

Thermal analysis of polymers was carried out with a Perkin-Elmer DSC7 differential scanning calorimeter equipped with a PE-7700 computer and TAS-7 software. Calibration was performed with pure indium. Samples (5–10 mg) were heated from –60° C. to 200° C. at a heating rate of 20° C./min., annealed for 5 min. and cooled to –60° C. (20° C./min.). Subsequently, a second heating curve was recorded. Melting (T$_m$) and crystallization (T$_c$) temperatures were taken from peak maxima of the second heating and the cooling curves, respectively, and the area under the curves as ΔH.

The inherent viscosity η$_{inh}$ of the polymers was determined using a Cannon 55 L117 viscometer at 20° C. and polymer solutions of 5 mg/ml in a mixture of chloroform and methanol (1:1, v/v). The intrinsic viscosity [η] was determined using concentrations of 20, 10, 6.7 and 5 mg/ml of polymer in a mixture of chloroform and methanol (1:1, v/v). Poly(ether ester amide) films were prepared from solutions of 1 g copolymer in 7 ml chloroform/methanol (1:1 v/v). The polymer solutions were cast onto a glass plate using a 0.75 mm casting knife. The solvent was slowly evaporated at room temperature and then the films were dried in vacuo for 3 days. To measure the degree of swelling of the polymers, dry films (15 mm in diameter and 50–100 μm in thickness)

were weighed and immersed in PBS at 37° C. in a shaking bath. The kinetics of swelling was evaluated by periodically measuring the weight of films after blotting the surface with a tissue, until equilibrium was reached. The equilibrium swelling ratio q was determined from the ratio of the equilibrium weight of the swollen samples and the dry samples.

Polymer Degradation in PBS at 37° C.

To determine the degradation of the copolymers, dry films (15 mm in diameter and 50–100 μm in thickness) were weighed and immersed in PBS at 37° C. in a shaking bath. After certain time intervals, samples were taken and weighed after drying in vacuo for 3 days. The weight loss was calculated by:

$$\text{weight loss } (\%) = 100 \times (W_0 - W_1)/W_0. \quad (1)$$

where $W_0$ and $W_1$ are the weights of the films before and after degradation, respectively. The change in inherent viscosity of the polymers during degradation was monitored, as well as the effect of degradation on the composition of the polymers ($^1$H NMR).

Release of lysozyme from poly(ether ester amide) Films

A protein solution (0.6 ml, 55 mg/ml) in PBS was emulsified in a polymer solution (1 g polymer in 9 ml chloroform/methanol, 8:1 v/v) using ultra-turrax mixing (30 s at 20.5 krpm, Ika Labortechnik T25). The resulting water-in-oil emulsion was cast onto a glass plate using a 0.75 mm casting knife. After slow evaporation of the solvents, films were removed from the glass plate and stored over $CaCl_2$ in a desiccator at 4° C. Lysozyme (14.5 kD) was used as a model protein.

The lysozyme containing films (15 mm diameter) were incubated in 1.5 ml PBS (pH 7.4). Vials were continuously shaken at 37° C. and samples were taken at various time points. The protein concentration in the buffer was determined using a standard Coomassie Blue assay (Pierce). Buffer was refreshed after sampling. The thickness of the swollen membranes was measured using a micrometer.

Results and Discussion

Synthesis of bisester-bisamide monomer and poly(ether ester amide)s

A series of poly(ether ester amide) (PEEA) multiblock copolymers was synthesized from PEG1000, 1,4-dihydroxybutane and aliphatic diamide-dimethyl ester monomers. The bisester-bisamide monomers were prepared in the melt from 1,4-diaminobutane and dimethyl adipate according to a procedure as has been described in NL-A-10.03459 (scheme 1). After purification, the obtained product yield was 71%. $^1$H-NMR analysis confirmed the chemical structure and the purity of the diamide-dimethyl ester monomers. FIG. 1 shows the $^1$H-NMR spectrum of the bisester-bisamide monomer in DMSO-$d_6$. The melting temperature of the product was 141° C.

Polymerization was carried out using a two step process. The first step involves transesterification of the diamide-dimethyl ester monomers with PEG and an excess of 1,4-dihydroxybutane at 175° C. for 4 hours, using $Ti(OBu)_4$ as a catalyst and α-tocopherol as an antioxidant to prevent thermal degradation of PEG. Then, polycondensation was performed at 220° C., using vacuum to facilitate removal of the condensation product 1,4-dihydroxybutane. The overall reaction is given in scheme 2. PEEA multiblock copolymers with a mole fraction of hydrophilic blocks varying from 0.1 (20 wt % PEG) to 0.7 (65 wt % PEG) were prepared.

Figure 2:
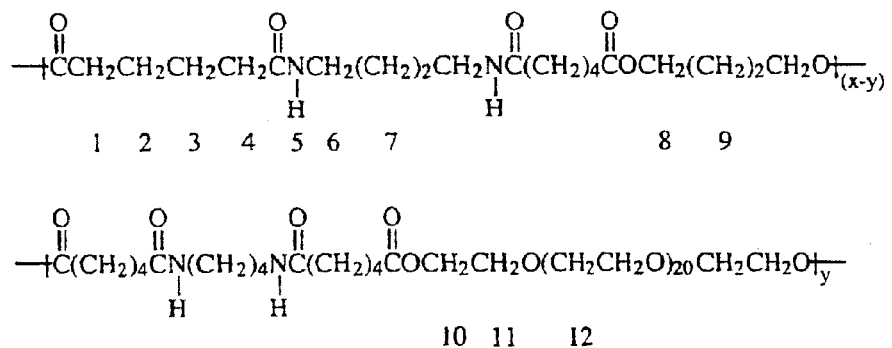
Figure 2:
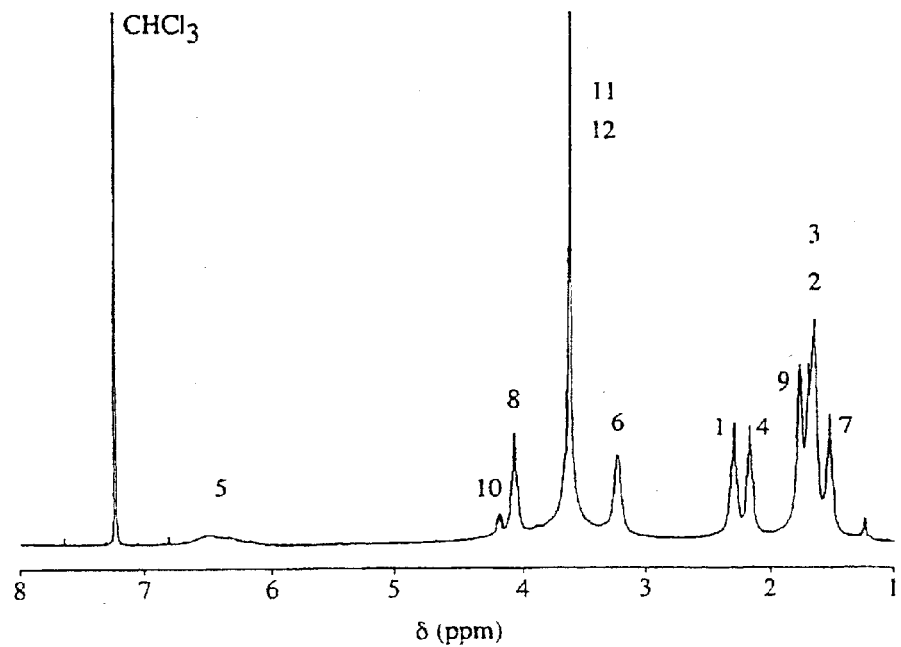

The results of the polymerizations are given in table 1. The composition of the copolymers was calculated from $^1$H-NMR spectra, a typical spectrum is shown in FIG. 2 (FIG. 2 shows the $^1$H-NMR spectrum of poly(ether ester amide) PEEA1 in $CDCl_3$). The ratio between integral intensities originating from protons 6 (amide segment), 8 (butanediol), 10, 11 and 12 (PEG), was used to calculate the PEG content of the PEEA copolymers. As shown in table 1, the obtained composition was in good agreement with the polymer composition expected from the feed composition. It was not possible to determine the number-average molecular weight of the polymers from $^1$H-NMR spectra, since integral intensities of the endgroups were too small. This indicates that the molecular weight of the PEEA copolymers is in the range of 20 kg/mole or higher. The intrinsic viscosity of the polymers varied from 0.58–0.78.

TABLE 1

Results of the polymerization of poly(ether ester amide)s.

| Polymer | PEG content based on feed (wt %) | PEG content in polymer (wt %)[a] | Intrinsic viscosity[b] (dL/g) |
|---|---|---|---|
| PEEA1 | 20 | 23 | 0.63 |
| PEEA2 | 31 | 32 | 0.68 |
| PEEA3 | 41 | 40 | 0.58 |
| PEEA5 | 55 | 54 | 0.78 |
| PEEA7 | 65 | 66 | 0.68 |

[a]PEG content in the copolymer after purification as determined by $^1$NMR
[b]determined using a mixture of chloroform and methanol (1:1 v/v) at 20° C.

Thermal Properties of Poly(ether ester amide)s

Figure 3:
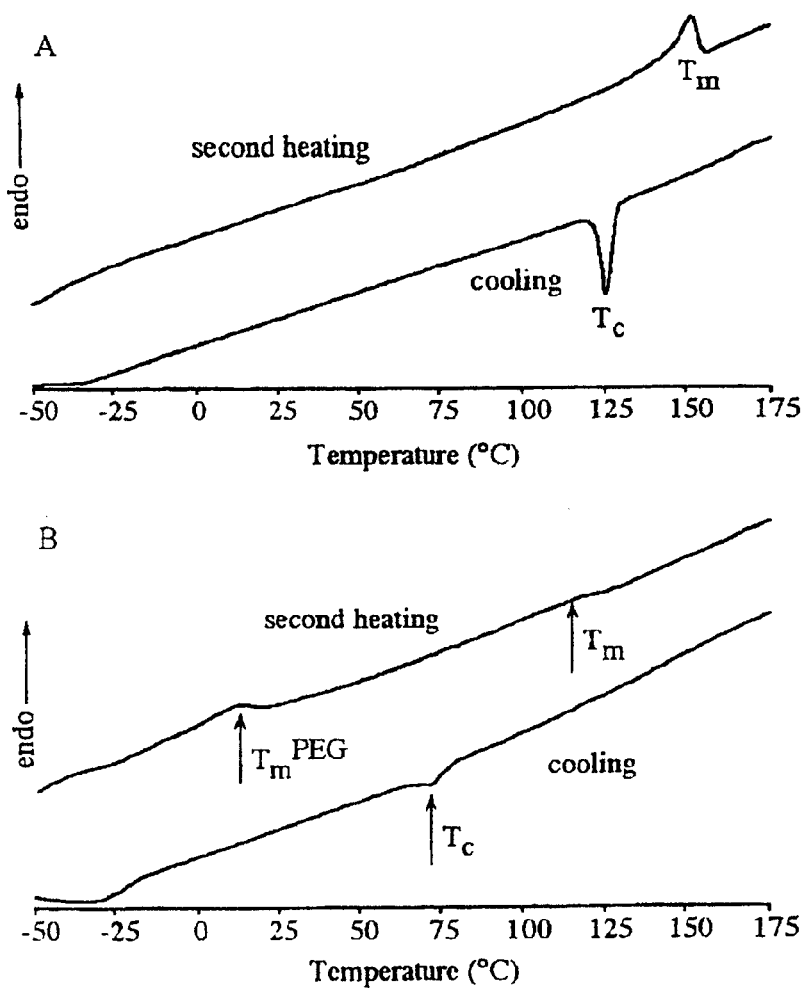

The thermal properties of the synthesized PEEA copolymers were determined by differential scanning calorimetry (DSC). In FIG. 3, the second heating and cooling traces for PEEA1 and PEEA5 are shown to illustrate the data listed in table 2. More in particular, FIG. 3 shows data of DSC (second) heating and cooling scans (20° C./min.) of poly(ether ester amide)s PERA1 (A) and PEEA5 (B).

For comparison, the characteristics of the homopoly(ester amide) PEEA0 are included (obtained from H. R. Stapert, PhD Thesis, University of Twente, 1998, pp. 169–192). Over the temperature range of −50° C. to 200° C. two transitions were observed, which confirmed the phase separated structure of the copolymers. The high temperature transitions can be attributed to the melting and crystallization of the amide block, and the transition at low temperature to melting or crystallization of PEG.

TABLE 2

Thermal properties of the poly(ether ester amide)s.

| Polymer | $T_m$ (° C.) | $T_m - T_c$ (° C.) | $\Delta H_m$ (J/g) | $\Delta H_m$ (J/g h.b.)[a] | $T_m^{PEG}$ (° C.) | $\Delta H_m^{PEG}$ (J/g) |
|---|---|---|---|---|---|---|
| PEEA1 | 152 | 26 | 19 | 28 | — | — |
| PEEA2 | 151 | 30 | 19 | 33 | — | — |
| PEEA3 | 136 | 41 | 16 | 33 | 5 | 10 |
| PEEA5 | 116 | 43 | 6 | 20 | 12 | 15 |
| PEEA7 | 90 | — | 2 | 15 | 23 | 25 |
| PEEA0[b] | 154 | 37 | 34 | 34 | | |

[a]melting enthalpy per g hard block
[b]the characteristics of the homopoly(ester amide) PEEA0

Swelling of PEEA Films in PBS Buffer at 37° C.

Figure 4:
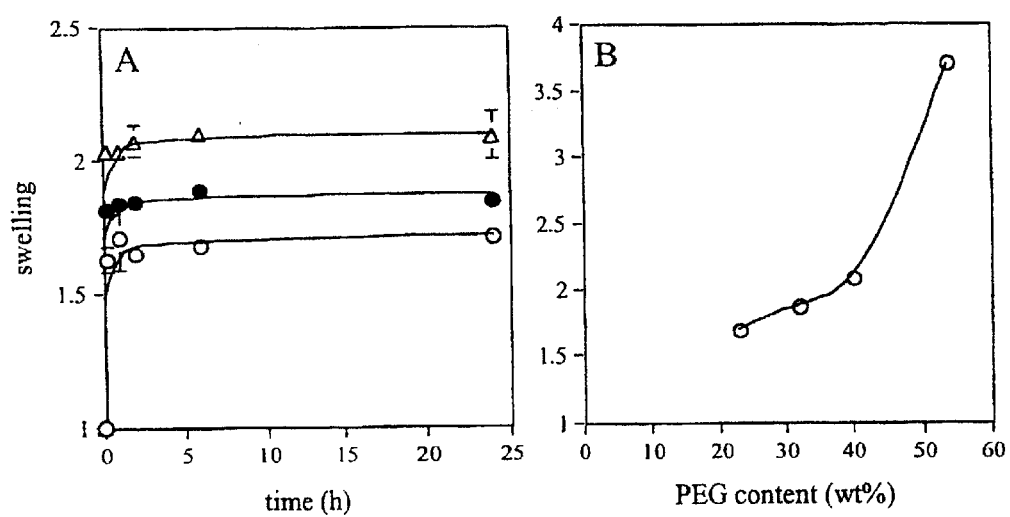

For controlled release devices, the properties of the water-swollen matrices are of primary interest. For example, the extent of swelling largely determines the rate at which water-soluble drugs, such as proteins, are released from controlled release devices. Therefore, the swelling behavior of solvent cast, poly(ether ester amide) films was investigated as a function of the copolymer composition. Equilibrium swelling (q) in PBS at 37° C. was reached within five hours (FIG. 4A). As expected, the equilibrium swelling ratio increased with increasing amount of the hydrophilic component, PEG, in the hydrogel (FIG. 4B). (FIG. 4. Swelling behavior of PEEA films in PBS at 37° C. A: Swelling kinetics of PEFA1 (O), PEEA2 (●) and PEEA3 (?). B: Equilibrium swelling as a function of the PEG content of the copolymers. (n=3; ±s.d.).)

In Vitro Degradation of PEEA Matrices

Figure 5:
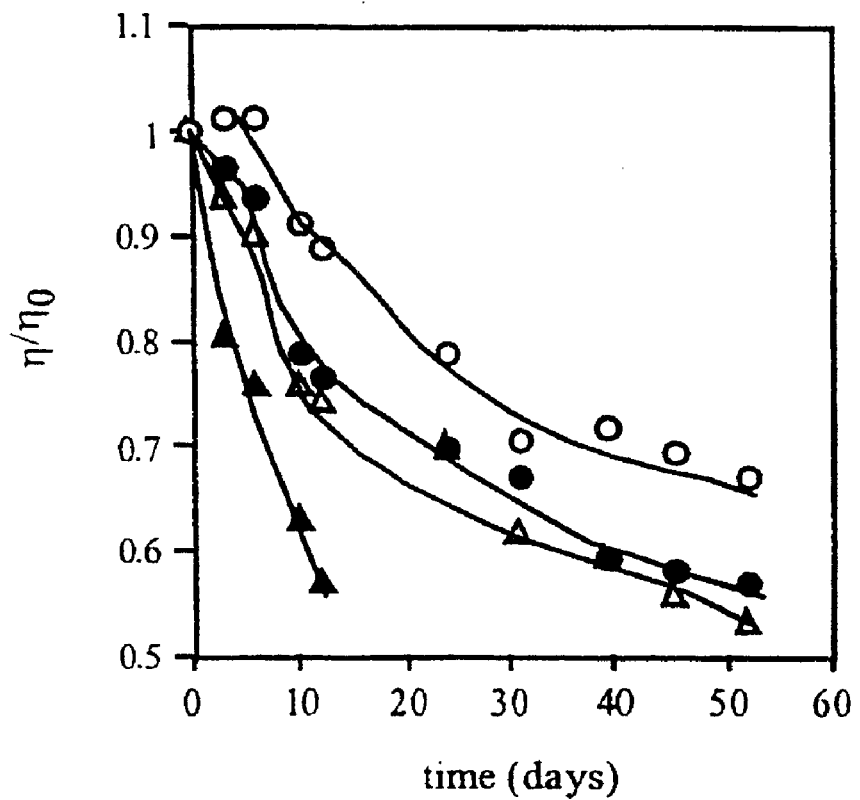
Figure 6:
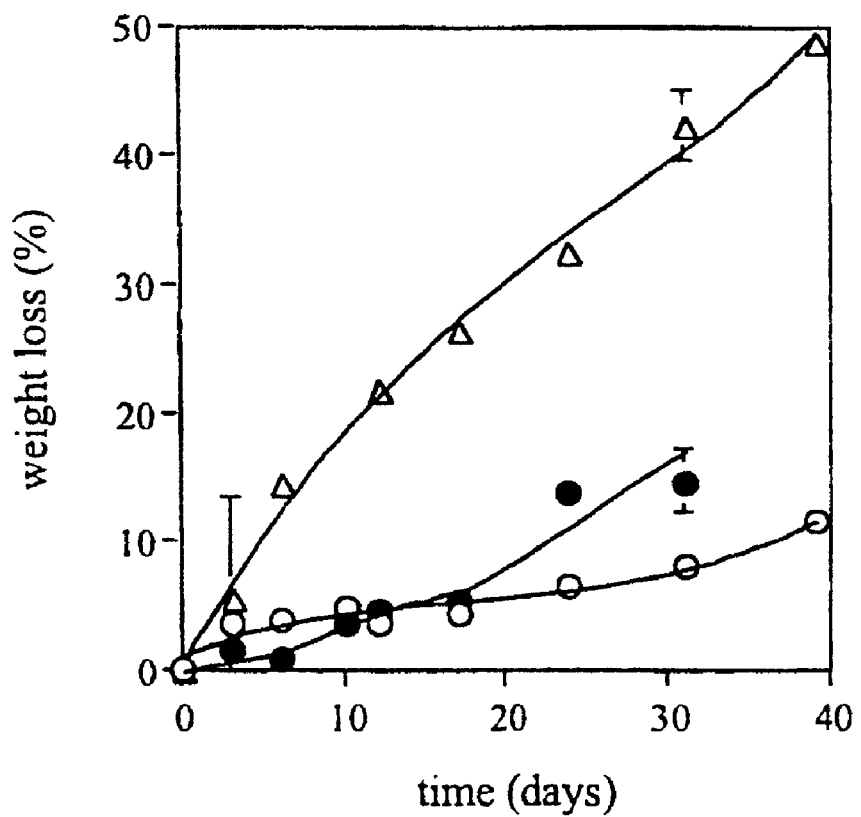

The in vitro degradation of PEEA copolymer films in PBS was examined at 37° C. PEEA7 was not selected because this copolymer was rapidly dissolved in the buffer. FIG. 5 shows that immediately after immersion in the buffer, a decrease in inherent viscosity was observed for the polymers, except for PEEA1. More in particular, FIG. 5 shows the change of the inherent viscosity as a function of degradation time in PBS at 37° C. of PEEA1 (O), PEEA2 (●), PEEA3 (Δ) and PEEA5 (▲) (n=3;±s.d.). For this copolymer, the decrease in viscosity started after 6 days incubation. During the first days of incubation, PEEA1 showed a small increase of the inherent viscosity. Probably, this is the effect of leaching out of low molecular weight oligomers, which were formed during the polycondensation process. The decrease in viscosity was more pronounced with increasing PEG content of the copolymers. A similar relation was found for the weight loss of the films. FIG. 6 shows the weight loss as a function of degradation time in PBS at 37° C. of PEEA1 (O), PEEA2 (●) and PEEA3 (Δ) (n=3;±s.d.).

Lysozyme Release from PEEA Films

A preliminary investigation was carried out on the suitability of the PEEA copolymers as a matrix for the controlled release of proteins. Lysozyme, a 14.5 kD cationic enzyme, was used as a model protein. Protein containing films were prepared by a water-in-oil emulsion method. The swelling of such films in PBS was not significantly different from the swelling of unloaded films (table 3). Release profiles of lysozyme from poly(ether ester amide) films varying in copolymer composition are presented in FIG. 7. The cumulative release is plotted as a function of the square root of time, which gave a linear relationship for the first part of the release curve. This indicates that the release is governed by Fickian diffusion. More in detail, FIG. 7 shows the release of lysozyme in PBS at 37° C. from PEEA1 (O), PEEA2 (●), PEEA3 (Δ) and PEEA5 (▲) as a function of the square root of time (n=3;±s.d.).

Figure 7:
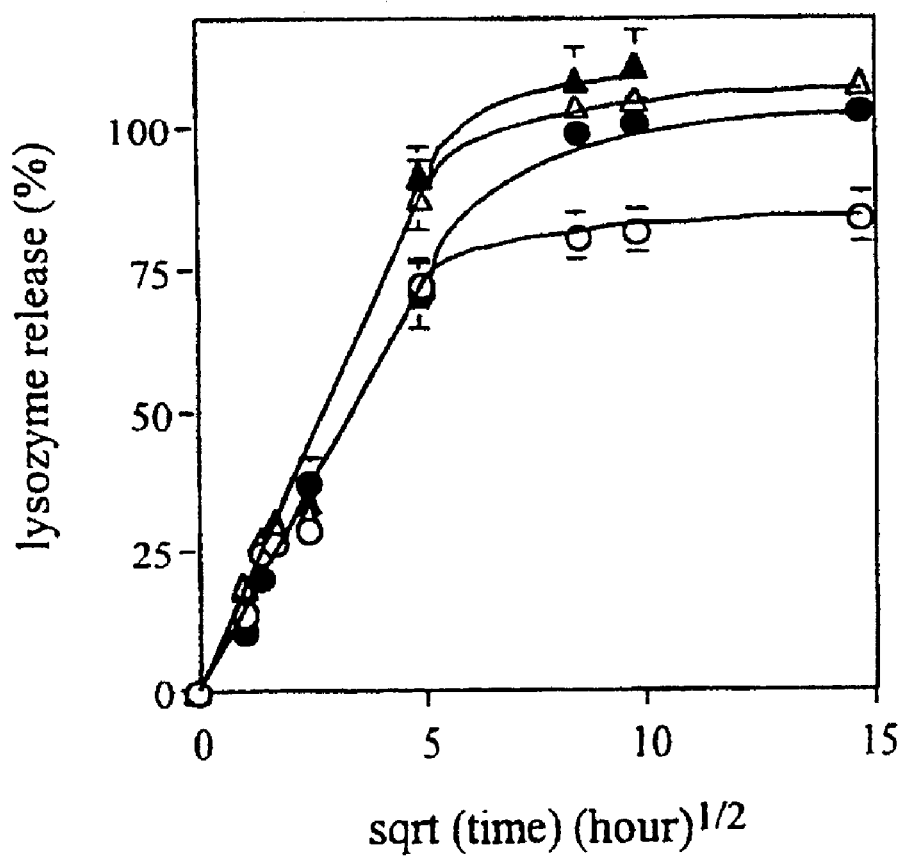

From FIG. 7, lysozyme diffusion coefficients were obtained using equation 2:

$$\frac{M_t}{M_\infty} = 4\sqrt{\frac{D_{initial} t}{\pi l^2}} \quad (2)$$

in which $M_t/M_8$ is the fraction released lysozyme, l is the thickness of the film and t the time. The results, presented in table 3, show that the diffusion coefficients are very small compared with the diffusion of lysozyme in water ($10^{-6}$ cm$^2$/s).

TABLE 3

Equilibrium swelling ratio and diffusion coefficient for lysozyme in PBS at 37° C. of PEEA films. Protein content is 33 mg lysozyme per g copolymer.

| Polymer | equilibrium swelling ratio | $D_{lysozyme}$ (× $10^{10}$ cm$^2$/s) |
|---|---|---|
| PEEA1 | 1.79 ± 0.02 | 0.8 ± 0.2 |
| PEEA2 | 1.98 ± 0.02 | 1.3 ± 0.2 |

TABLE 3-continued

Equilibrium swelling ratio and diffusion coefficient for lysozyme in PBS at 37° C. of PEEA films. Protein content is 33 mg lysozyme per g copolymer.

| Polymer | equilibrium swelling ratio | $D_{lysozyme}$ (× $10^{10}$ cm$^2$/s) |
|---|---|---|
| PEEA3 | 2.04 ± 0.01 | 1.3 ± 0.1 |
| PEEA5 | 3.97 ± 0.03 | 1.8 ± 0.1 |

The model protein used in this study is rather small (14.5 kD). It can be expected that release of larger proteins is much slower and is more dependent on the copolymer composition. Furthermore, in the present study the length of the PEG segment was fixed at 1000 g/mole. Most likely, the use of PEG segments of various lengths offers possibilities to manipulate the structure of the poly(ether ester amide)s to a larger extent, allowing a more precise control of protein release rates.

What is claimed is:

1. A biologically degradable copolymer comprising constant blocks (CB) and variable blocks (VB) of the formula:

—(CB)—(VB)— (1)

wherein CB and VB may be the same or different building blocks, and CB represents a block with a constant length and the general formula:

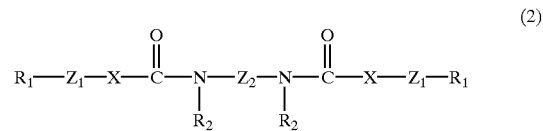

(2)

wherein:

X may or may not be present and, if present, represents an oxygen;

$Z_1$ and $Z_2$ are the same or different and represent a group with the general formula (CR'R")$_q$ in which q≧1 and R' and R" are the same or different and represent an H, CH$_3$, hydrocarbyl or substituted hydrocarbyl with an O, N and/or S functionality, or $Z_1$, and/or $Z_2$, represent a group with the general formula —((CR'R")$_r$—Q—(CR'R")$_s$)$_t$ in which t≧1 and R' and R" are the same or different and represent an H, CH$_3$, hydrocarbyl or substituted hydrocarbyl with protected O, N and/or S functionality, r and s are different or the same and can each be ≧O with the proviso that s+t≧1, and Q is a heteroatom, or a heteroatom containing group;

$R_1$ represents an H, OH or COOH group, which group has reacted in the general formula (1) to form an ester bond;

$R_2$ is hydrogen or hydrocarbyl or substituted hydrocarbyl with protected O, N and/or S functionality with a maximum of 30 carbon atoms; VB represents a block with a variable length, which block is formed by one or more monomers from the group consisting of alkanediacids, alkanediacid-chlorides, alkanediols, poly(alkane ether)diols, poly(alkane ether)diacids, hydroxy acids, lactones, and diisocyanates, characterized in that the copolymer comprises hydrophilic blocks, and more than one type of variable blocks.

2. Copolymer according to claim 1, wherein CB is a block with the general structure:

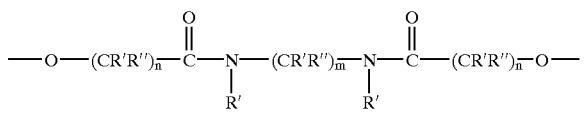

wherein n≦15, m≦12, and R' and R" are as defined in claim 1.

3. Copolymer according to claim 1, wherein CB is a block with the general structure:

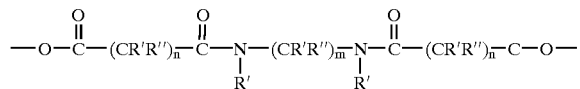

wherein n≦14, m≦12, and R' and R" are as defined in claim 1.

4. Copolymer according to claim 1, wherein CB is a block with the general structure:

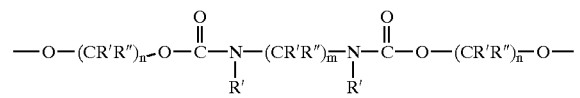

wherein n≦4, m≦12, and R' and R" are as defined in claim 1.

5. Copolymer according to claim 1 obtained by a copolymerization reaction between two monomer compositions, wherein the first monomer composition comprises one or more CB blocks as defined in claim 1, and the second monomer composition comprises one or more VB blocks selected from the group consisting of alkanediacids, alkanediacid-chlorides, alkanediols, poly(alkane ether)diols, poly(alkane ether)diacids, alkanediacid anhydrides, poly(alkane ether)diacid-anhydrides, and combinations thereof, optionally in combination with a diisocyanate.

6. Copolymer according to claim 1, wherein $Z_2$ comprises a hydrophilic block.

7. Copolymer according to claim 1, wherein VB comprises a hydrophilic block.

8. Copolymer according to claim 1, wherein one of the following monomers serves as first monomer composition: N,N-1,4-butanediyl-bis[6-hydroxy hexanamide], N,N-bis[2-hydroxyethyl]-1,6 hexanedicarbamate, poly(alkane ether)diacids, and wherein the following monomers serve as second and third monomer composition: dimethyl adipate as a second monomer composition and 1,2-ethanediol or 1,4-butanediol as a third monomer composition.

9. Copolymer according to claim 1, wherein the hydrophilic blocks are water soluble blocks.

10. Copolymer according to claim 9, wherein the hydrophilic blocks comprise polyalkylene glycols.

11. Copolymer according to claim 10, wherein the polyalkylene glycol comprises polyethylene glycol.

12. Copolymer according to claim 1, comprising at least 5 wt. % of hydrophilic blocks, based on the weight of the copolymer.

13. Process for preparing a copolymer according to claim 1, wherein at least two monomer compositions are copolymerized with each other, the first monomer composition comprising one or more CB blocks as defined in claim 1, the second monomer composition comprising one or more VB blocks comprising alkanediacids, alkanediacid-chlorides, alkanediols, poly(alkane ether)diols, poly(alkane ether)diacids, hydroxy acids, lactones or diisocyanates, characterized in that the second monomer composition comprises hydrophilic monomers.

14. A method of using a copolymer according to claim 1 comprising:
    fashioning the copolymer into a scaffold; and
    using the scaffold for engineering tissue.

15. A method of using a copolymer according to claim 1 comprising:
    combining the copolymer with a pharmaceutical composition including a bioactive agent in a manner to produce a controlled release pharmaceutical device, wherein the copolymer facilitates the controlled release of the bioactive agent.

16. A method of using a copolymer according to claim 1, wherein the copolymer is biodegradable comprising:
    fashioning the copolymer into an article; and
    using the article in an environment in which it biodegrades.

17. Copolymer according to claim 10, wherein the polyalkylene glycols comprise copolymers of polyethylene glycol and polypropylene glycol or polybutylene glycol.

* * * * *